UNITED STATES PATENT OFFICE 2,663,685

ELECTROLYTIC PRODUCTION OF DIHYDRO-STREPTOMYCIN AND SALTS THEREOF

Gabor B. Levy, Lawrenceburg, Ind., assignor to Schenley Industries, Inc., New York, N. Y., a corporation of Delaware No Drawing. Application October 17, 1950, Serial No. 190,651

9 Claims. (Cl. 204—75)

This invention relates generally to improvements in derivatives of antibiotic agents antagonistic to pathogenic microorganisms, and to improvements in processes for manufacturing same. More particularly, this invention relates to novel antibiotic agents obtained by treatment with nascent hydrogen, of certain antibiotic metabolites produced by microorganisms of the genus Streptomyces, especially the microorganism S. griseus.

It is well known that certain metabolites produced by proliferation of microorganisms of the genus Streptomyces possess remarkable antibiotic activity against pathogenic bacteria, both in vitro and in vivo. These metabolites have been designated, streptomyin. It has been established that streptomycin is chiefly a substance represented by the general formula:

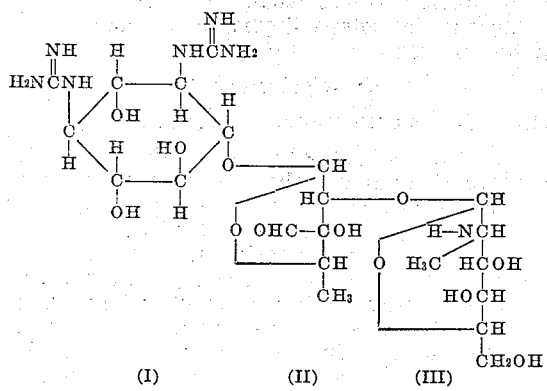

This substance may be regarded as the product of a hypothetical condensation reaction involving elimination of two molecules of water and producing saccharide linkages between moieties corresponding to the three principal groups in the above formula, which have been designated streptidine (I), streptose (II) and N-methyl-L-glucosamine (III).

Almost from the first clinical use of streptomycin, it was recognized that neither the free base nor its salts were ideal chemotherapeutic agents. Toxic manifestations, varying in intensity and including pain at the site of injection, nausea, dizziness, anaphylactic shock resembling the shock produced by histamine and histamine-like materials, labored breathing, lowered blood pressure, vertigo tinnitus, transient or permanent impairment or total loss of hearing, and fatty infiltration of the liver, were encountered in some patients.

Although it was recognized that the pure substance streptomycin, or its salts, might very well possess some toxicity, the fact that there was considerable qualitative and quantitative variation in toxicity of commercial streptomycin from one batch to the next led many authorities to believe that some of the untoward effects that were observed were caused by impurities incompletely removed during the extraction and other purification procedures. For example, the anaphylactic reaction produced was attributed to histamine or similar substances, known to be present in corn steep liquor, which perhaps were carried over into the final product. While improved procedures for purifying streptomycin were developed, as experience in manufacturing the drug increased, it became evident that these undesirable physiological responses could be reduced in magnitude merely, not eliminated. Even this purified form of streptomycin frequently was found to induce symptoms of chronic toxicity such as dizziness, deafness and other disturbances due to damage of the eighth cranial nerve when used over the long period of time required in treatment of tubuerculosis.

Another form of streptomycin, distinctly less acutely neurotoxic than streptomycin but having the same pharmacologic and antibacterial properties in humans as its parent substance, is dihydrostreptomycin, which appears to be the most desirable presently available form of medication for cases in which streptomycin is indicated. This substance may be administered over prolonged periods with less danger of eighth nerve damage than occurs with streptomycin, it causes very much lower incidence of dizziness and disturbance in equilibrium than is observed with administration of streptomycin, and it may be administered in larger doses.

Dihydrostreptomycin, which, like streptomycin, is administered largely in the form of the sulfate, differs in chemical structure from streptomycin only in that the carbonyl group of the streptose moiety is reduced to a carbinol group and the streptidine and N-methyl-L-glucosamine portions of the molecule are unchanged. In accordance with the process presently employed for manufacturing dihydrostreptomycin, the reduction of the streptose carbonyl group is effected by hydrogenating streptomycin trihydrochloride at atmospheric pressure, while in aqueous solution and in the presence of a nickel or a noble metal, such as a platinum catalyst. About one molar equivalent of gaseous or molecular hydrogen is absorbed per mol of streptomycin used, then the solution, after filtering to remove the catalyst, is dehydrated from the frozen state, or treated with a precipitating agent, to yield the product as a white granular solid that in a typical instance has an activity of about 750 units per milligram as compared with an activity of about 800 units per milligram for the pure streptomycin used as starting material. Dihydrostreptomycin, in contrast to streptomycin, forms no oxime or semicarbazone, nor is it inactivated by hydroxylamine in aqueous pyridine solution at pH 4. It is not degraded to maltol when treated with aqueous alkali, nor is it inactivated by cysteine under conditions that cause the inactivation of streptomycin.

This process for manufacturing dihydrostreptomycin has the disadvantage of requiring a very costly catalyst and the further disadvantage that this catalyst is easily destroyed by catalyst poisons that are normally present in the streptomycin unless a specially purified starting material is employed. The purification of the streptomycin to effect removal of catalyst poisons is costly, not merely because it adds to the number of manufacturing steps required to yield the finished product, but, also, because of the inevitable losses in material and in the potency of the processed material that occur in the purification operations. These steps, moreover, are in addition to the elaborate procedures necessary to remove or minimize physiologically active impurities in the streptomycin, such as histamine and histamine-like materials, which would make the product unsuitable for therapeutical uses. A further disadvantage of this process for making dihydrostreptomycin is that it requires the use of ponderous, expensive equipment, characteristic of catalytic hydrogenation processes, that not only necessitates a substantial capital investment, but which also requires costly care and maintenance, if early replacement is to be avoided.

The process according to the present invention efficiently produces dihydrostreptomycin by reaction of streptomycin with an unusually reactive form of mono-atomic hydrogen—hydrogen in statu nascendi—whereby the streptose carbonyl group is converted to a carbinol group. The hydrogenating agent used in this process is an entirely different substance, when viewed in terms of its chemical reactivity, from ordinary hydrogen in the gaseous state, for the latter, by comparison, is a relatively inert and chemically unreactive material. The use of this highly reactive form of hydrogen imparts to the invented process the extremely important advantages over the other process for making dihydrostreptomycin previously described, of entirely eliminating need for use of a costly catalyst or, indeed, of any catalyst whatever, and additionally it permits use of streptomycin as a starting material without the same degree of prior processing needed to remove physiologically inactive trace impurities that might act as catalyst poisons.

Another advantage of the invented process over the catalytic process is that, unexpectedly, it is found that the product obtained by the former process contains less histamine or histamine-like impurities than are found to be present in dihydrostreptomycin when obtained by catalytically hydrogenating another portion of the same raw material. This unexpected improvement in the purity of the product is of major importance from the viewpoint of commercial exploitation of the process because it shortens the costly processing required for reducing physiologically active impurities to therapeutically acceptable levels, thereby lowering the cost of manufacturing the product. A further advantage of the invented over the catalytic process is that the former does not require expensive or highly specialized equipment such as is needed for catalytic hydrogenation processes.

Broadly viewed, the process of this invention comprises directly reacting streptomycin with an agent capable of converting an aldehydic carbonyl group to a carbinol group, the agent being hydrogen in statu nascendi, whereby the streptomycin is converted to dihydrostreptomycin. The hydrogen utilized in the reaction can be produced by electrolysis of an electrolyte containing ionic hydrogen, or it may be produced by a chemical displacement reaction of an element, more electropositive then hydrogen, acting upon a hydrogen-containing polar compound. These two types of processes are not entirely equivalent because the electrolytic process can produce atomic hydrogen having materially greater chemical activity than the hydrogen produced by chemical displacement and moreover the reaction product in the former process is not contaminated with by-products as in the latter process, hence the electrolytic process is preferred for making atomic hydrogen in statu nascendi.

In accordance with the preferred embodiment of this invention, an aqueous, substantially neutral electrolyte containing dissolved streptomycin is subjected to electrolysis, at or slightly above room temperature, using a cathode formed of a metal having a high hydrogen overvoltage and using a cathode potential near but preferably below that potential required for liberation of gaseous hydrogen at the cathode, whereby the streptomycin acts as a cathodic depolarizer to yield dihydrostreptomycin. At the cathode, during the electrolysis, the half cell reaction may be represented:

(1) $H^+ + \text{electron} = (H)$ (2) $2(H) + \text{streptomycin} = \text{dihydrostreptomycin}$ It is evident that if the rate of reaction 1 exceeds the rate of reaction 2, the cathode potential will gradually increase and when it becomes sufficiently high, gaseous or molecular hydrogen will be liberated, thus decreasing the current efficiency of the reduction of the depolarizer, since molecular hydrogen has little or no reducing power in the absence of a catalyst. Under some circumstances, for instance, where it is desirable to generate gaseous hydrogen to cause agitation of the catholyte in the immediate vicinity of the cathode, this operating voltage limitation may be disregarded and higher voltages may be used during the electrolysis.

A non-homogeneous electrolyte is preferably used in practicing the electrolytic process of the present invention, because this permits the most efficient use of the starting material by minimizing its destruction, inactivation or conversion to undesirable by-products. In this manner, all the streptomycin introduced originally into the electrolyte can be restricted to the catholyte in the immediate vicinity of the cathode, during at least the initial period of the electrolysis, where its reduction to dihydrostreptomycin takes place, and excluded by an electrolyte-semipermeable partition from the anolyte where no reduction could take place, but, instead, only oxidation and destruction of the streptomycin. It will be understood, of course, that although use of a non-homogeneous electrolyte is preferred, a homogeneous electrolyte comprised of the catholyte may be used if desired.

The catholyte used in the preferred embodiment of the invented process comprises an aqueous or aqueous alcoholic solution containing streptomycin, which may be in the form of a simple mineral acid salt such, for example, as streptomycin sulfate or streptomycin hydrochloride, and may contain, also, an agent for improving the conductivity of the solution, such as a readily ionizing mineral acid salt. Aqueous solutions of streptomycin salts of the type mentioned above usually have a hydrogen ion concentration of less than pH 7.0 and, because experience indicates that the optimum initial hydrogen ion concentration in the catholyte is at least pH 5 and preferably above pH 7, it is desirable to add to the catholyte, prior to use, an alkaline substance, such as dilute aqueous sodium hydroxide or sodium carbonate solution, whereby the pH of the solution is increased, although not above about pH 8.5. The proportion of streptomycin salt in the catholyte is not critical and may be adjusted as desired within a wide range, limited chiefly by the inconvenience of handling very concentrated solutions, because of their high viscosity, and the inefficiency of using very dilute solutions which, quite apart from the low rate of production of dihydrostreptomycin, is aggravated by the difficulty of recovery of the small quantities of product from large volumes of solution. For these practical reasons, the range of optimum initial concentration of streptomycin in the catholyte may be set empirically at 5 to 25 parts by weigth of streptomycin as free base or salt per 100 parts by weight of solution. The preferred concentration of streptomycin in the catholyte is about 50,000 to 250,000 units per milliliter. If the solution used is so dilute as regards its streptomycin content that its electrical resistance is undesirably high, a simple inorganic salt, such as sodium sulfate, or sodium bisulfate may be added to improve the conductivity of the catholyte. Under some circumstances it may be desirable to use an aqueous alcoholic catholyte, but, in general, this type of catholyte is less satisfactory than catholytes substantially free of alcohol.

The anolyte used in the practice of the invented electrolytic process may be any good-conducting electrolyte, such as a solution of a simple mineral acid, for example sulfuric acid, or a solution of a readily ionizing salt, for instance, zinc sulfate, sodium sulfate or sodium bisulfate. An aqueous sulfuric acid solution containing about 20% by weight of acid is a satisfactory anolyte or, if desired, an aqueous sodium sulfate solution containing about 1% by weight of dissolved salt may be used. It will be recognized that if a salt solution is used as the anolyte, the salt concentration should be so adjusted with regard to its osmotic pressure that it does not diffuse through the permeable partition into the catholyte nor does the catholyte diffuse into the anolyte.

Because the streptomycin reduction to dihydrostreptomycin in the process of this invention occurs at the cathode, the selection of the metal from which this electrode is formed is of importance in practice of the process. Metals having low hydrogen overvoltages such as platinum metals, which are known to be the best catalyst for hydrogenation reactions, are least suitable for use as cathode material in the practice of this invention. The most satisfactory metals for this purpose are those having very high hydrogen overvoltages, because, by using cathodes formed of these metals, the activity of the atomic hydrogen in statu nascendi is increased and thus the reduction of the streptose carbonyl group is facilitated.

The electrolytic process of this invention, accordingly, is preferably practiced using a cathode of a metal having a high hydrogen overvoltage, the higher being the better, unless other factors make use of such a metal undesirable. Mercury, for example, has a high hydrogen overvoltage which, indeed, is the highest of the common metals, and, thus, it would appear to be the most desirable metal for use in the invented process, were it not a liquid, which, in large measure, limits its use to shallow tanks in which it lies horizontally at the bottom and has an effective area limited to its upper surface. These factors, and the large capital investment required have made liquid mercury appear to be less desirable than other cathode materials for use in commercial scale operations.

The preferred cathode material for use in the invented process is lead, which is especially satisfactory when in a highly purified form and activated by being provided with a surface layer of spongy lead, formed in situ. Activation of the cathode can be easily accomplished by first making it the anode during electrolysis of dilute sulfuric acid, then making it the cathode during electrolysis of a freshly prepared aqueous alkaline alkali-metal plumbite solution, for instance, a diluted sodium hydroxide solution in which sodium plumbite has been dissolved. After a layer of sponge lead has formed, on the electrode, the electrode is removed and carefully rinsed with pure water before use. It is desirable that the cathode be shaped, for instance, fluted or grooved, to provide a maximum of surface per unit weight. Experence indicates that cathodes of lead amalgamated with mercury are less satisfactory than the activated lead type, and electrodes of carbon, platinum or iron are unsatisfactory, since reduction of the streptomycin to dihydrostreptomycin does not occur to any appreciable degree with use of these electrodes.

The anodes used in practice of the process of this invention preferably are of minimum effective surface, consistent with an electrical capacity to carry the current passed through the cell during the electrolysis, and may be formed from any material that is a good electrical conductor and that neither adversely affects nor is adversely affected by the anolyte. Carbon, platinum, lead, argentiferous lead and antimonial lead are satisfactory anode materials, the first-mentioned being preferred for use when the streptomycin salt component of the electrolyte is the trihydrochloride and the last-mentioned being preferred for use with a streptomycin sulfate electrolyte. In the last-mentioned instance, an alloy of lead containing about 5% to 6% of antimony is found to be especially satisfactory because of its cheapness, ready availability, the ease with which it can be worked into desired shapes and its excellent electrical properties.

The container in which the electrolysis is performed can be made of any material that possesses the desired physical properties and that does not adversely affect the production of the dihydrostreptomycin. Glass or ceramic bodies, preferably glazed, are satisfactory materials for this purpose. As above mentioned, it is desirable, in practicing the invented process, to segregate the anode section of the cell from the cathode section, which can be easily accomplished by interposing a semipermeable diaphragm or fritted glass or porous ceramic material between the two zones. The porosity of the diaphragm is such that the apparent resistance of the electrolyte measured between the electrodes is not materially increased when it is in place between them, although migration of streptomycin or dihydrostreptomycin from the catholyte into the anode section is minimized. An inexpensive and simple form of cell embodying these specifications can be made by supporting the selected electrodes in spaced relationship within a glass vessel, such as a battery jar, and arranging an Alundum or fritted glass cup or tube closed at one end, around the anode electrode, the capacity of vessel being sufficient to receive the full volume of catholyte without flooding into the cup, and the cup being of a capacity to receive without overflowing the full volume of anolyte.

The electrolytic reduction of streptomycin to dihydrostreptomycin is influenced by temperature changes and is increased in rate by rises in the operating temperature, but the benefit which may be achieved in this manner is more than offset by the disadvantage that streptomycin and its reduction product are thermolabile substances, hence are inactivated by heating. It has been found that operating temperatures below about 55° C. may be used advantageously and that optimum production may be attained at temperatures in the range of about 25° C. to about 30° C., which approximates the range of ordinary room temperatures. If desired, lower temperatures, for instance, temperatures as low as 10° C. may be used but with reduced cell conductivity and increased viscosity of the catholyte as incidental resultant disadvantages. In order to maintain the electrolyte at a temperature within the optimum range while the electrolysis proceeds, it is necessary to provide for cooling of the electrolyte which, otherwise, would be heated by its resistance to current passing through it. A convenient method of cooling the electrolyte is to use electrodes formed of individually continuous lengths of metal tubing through which a cooling medium may be circulated during the electrolysis. Agitation of the electrolyte further assists in the abstraction of heat from the system.

The rate at which streptomycin may be converted to dihydrostreptomycin by the electrolytic process is dependent upon the rate of both reactions 1 and 2 above. The rate of reaction 1 is dependent upon the availability of hydrogen ions in the catholyte and the density of the cell current at the cathode, which is directly proportional to the cathode potential. If the current density is such that the atomic hydrogen in statu nascendi, produced according to reaction 1, is not fully utilized by the cathode depolarizer, the streptomycin, then gaseous molecular hydrogen will be produced which is an inefficient utilization of the electrical energy because it does not contribute to production of dihydrostreptomycin. The full utilization of the atomic hydrogen by streptomycin, obviously, is promoted by having the latter present in a high effective concentration at the cathode, which can be readily achieved by using as concentrated a streptomycin solution as is practicable for the catholyte, and continuously agitating the catholyte during the electrolysis to assure that all its streptomycin content is brought to the cathode surface where the atomic hydrogen is formed. In this manner, the cathode potential may be increased materially above that threshold voltage required to pass, through the cell, a current which remains unvarying with time, and, by use of such high cathode potentials, the current density may be raised to desirable high levels, limited merely by the heating of the electrolyte due to the cell resistance. Thus, although the threshold cathode potential is merely about 2 volts, which is the decomposition potential of streptomycin and approximately the hydrogen overvoltage of suitable metal electrodes of the type hereinabove specified, efficient utilization of the atomic hydrogen as rapidly as it is produced permits operation at cathode potentials as high as 60 volts without hydrogen gas evolution. The use of high voltages results in excessive heating of the electrolyte which, in turn, causes destruction or inactivation of the streptomycin or dihydrostreptomycin present, and for this reason operating voltages within the range of 15 volts to 30 volts are deemed to be suitable. The most satisfactory current densities to be used in this process lie in the range of about 0.1 to 0.01 ampere per square centimeter of effective cathode surface.

During the electrolysis, as hydrogen ions in the catholyte are changed to atomic hydrogen, it is obvious that the resultant increase in pH will adversely influence the rate at which reaction 1 takes place and, also, if the catholyte is allowed to become very alkaline, say, to develop a pH substantially above 8.5, for instance pH 12, the streptomycin will be inactivated. In order to avoid this, an acid or acidic substance is added periodically to the catholyte in amounts adequate to maintain the pH well below about 12 at most, and, preferably, within the range of pH 5.0 to pH 8.5. Sulphuric acid or hydrochloric acid may be used satisfactorily for this purpose.

The completion of this reaction of converting streptomycin to dihydrostreptomycin can be determined by testing the catholyte for the presence of unreacted streptomycin. This determination may be made by polarographic analysis or chemical analysis, the most convenient being the maltol method. This method depends upon the fact that streptomycin, when heated in the presence of dilute alkali, forms maltol (2-methoxy-3-hydroxy-gamma-pyrone). Maltol is formed from the streptose portion of the streptomycin molecule and shows characteristic absorption in the ultraviolet region of the spectrum. It develops a color with ferric ammonium sulfate which is sensitive to 500 to 2500 micrograms of streptomycin and using the phenol reagent of Folin and Ciocalteau (Jour. Biol. Chem., 73, 627 (1927)) the test becomes sensitive to 20 to 250 micrograms of streptomycin. Dihydrostreptomycin does not produce maltol under the conditions of this test. Experience indicates that a satisfactory end point for the reduction reaction is reached when the maltol test indicates the streptomycin in the catholyte has been reduced to about 1½% of its initial value.

When the reduction is completed, the pH of the catholyte is adjusted with dilute sulfuric acid to approximaely pH 7.0 and then, while the current remains applied to the electrodes, the catholyte is drained to a receptacle, filtered, treated to remove lead and other heavy metals, and also treated to remove pyrogens preparatory to the dehydration which yields the dihydrostreptomycin in solid state.

Lead and other heavy metals, which may be present in trace amounts, for instance about a few parts per million, can be removed from the filtered dihydrostreptomycin solution by treatment with ion-exchange resins, such as the phenolformaldehyde ion-exchange resins of the type sold under the trade names Amberlite IR-4B and Amberlite IR-120. Pyrogens can be removed by treatment of the solution with carbon.

The following examples illustrate practical applications of the principles of this invention.

EXAMPLE 1

A glazed stoneware crock of about 15 gallons capacity is provided with a first electrode consisting of a helically wound tube of antimonial lead, arranged close to the interior wall of the crock with both its ends extending upward from the mouth of the crock. A first cylindrical porous porcelain pot, having a substantially uniform external diameter somewhat less than the internal diameter of the first electrode, is mounted coaxially within that electrode and a second electrode, consisting of a helix of longitudinally fluted pure lead tubing, having an outside diameter somewhat less than the internal diameter of the porous pot is mounted therein with its ends extending upwardly from the mouth of the pot. A second cylindrical porous porcelain pot is arranged coaxially within the second electrode and a third electrode of helically wound antimonial lead is mounted within the second porous pot. The first and third electrodes constitute the anodes of the cell and the second electrode is the cathode. Means are provide for agitating electrolyte in the vicinity of the cathode.

The zone between the crock and the first porous pot, and the second porous pot is filled with anolyte, consisting of an aqueous sulfuric acid solution containing about 20% of acid by volume, and the zone between the first and second porous pots is filled with catholyte consisting of an aqueous solution of streptomycin sulfate having an activity of about 200,000 units/ml. The streptomycin sulfate used need not be highly purified; a salt having an activity of about 700 units/mg. may be used although a somewhat purer salt, of course, is preferable.

Provision is made for circulating a cooling medium through each of the electrodes, and for adding acid to the catholyte during the electrolysis to maintain its hydrogen ion concentration within desired limits. An adjustable direct current power source is provided, having a rated maximum capacity of about 750 amperes at about 12 volts, and this power source is connected, through the usual metering means, to the cell electrodes.

The production of dihydrostreptomycin in the catholyte is begun, after the agitator and cooling medium circulator are operating, by adjusting the cell current at about 300 amperes to 400 amperes. The electrolyte is maintained at a temperature within the range of 25° C. to 30° C. during the electrolysis, and dilute sulfuric acid is added to the catholyte periodically when necessary to maintain its hydrogen ion concentration within the range of pH 7 to pH 8.5.

As the electrolysis proceeds, test samples of the catholyte are withdrawn periodically and analyzed for streptomycin content by the maltol method. When the streptomycin content is reduced to about 1½% of its initial value, the reduction of the streptomycin to dihydrostreptomycin is regarded as substantially completed, and the catholyte is withdrawn from the cell after its pH has been adjusted to about 7.0 and while power remains applied to the electrodes.

The dihydrostreptomycin solution may be treated to remove lead and other heavy metals, and pyrogens by any of the processes usually employed in purifying dihydrostreptomycin when prepared by catalytic hydrogenation of streptomycin.

Traces of streptidine sulfate, if present, may be separated from the dihydrostreptomycin by slowly adding the aqueous solution of dihydrostreptomycin, obtained from the electrolytic cell, to about five times its volume of methanol while agitating the mixture, and then continuing the agitation for about 20 to 30 minutes after the addition is completed. In this manner the dihydrostreptomycin sulfate, which is but sparingly soluble in aqueous methanol, is caused to separate from the mixture and is removed by vacuum filtration, washed with methanol and dried in vacuo. The dried product is then dissolved in about 1½ times its weight of pyrogen-free water at room temperature, then the solution is chilled and allowed to stand about 8 to 12 hours at about 5° C. to 10° C., whereupon streptidine sulfate crystallizes from the solution and is removed by filtration.

Lead and other heavy metals may be removed from the dihydrostreptomycin-containing filtrate by treatment of the solution with phenol-formaldehyde type cation exchange resins. For example the filtrate may be slowly passed through a column packed with a powdered mixture of equal volumes of the resin marketed under trade name "Amberlite IR-4B" and the resin marketed under the trade name "Amberlite IR-120" whereby lead and other heavy metals react with and are retained by the resins, leaving the purified dihydrostreptomycin in the liquid discharged from the tower. Pyrogens may be removed from this solution by treating it with activated carbon, such as the material sold under the trade name "Darco G-60."

Experience indicates that after the cell has been used for the production of several batches of dihydrostreptomycin, it is desirable to recondition or activate the cathode before further use. This may be done by withdrawing the electrode from the cell and making it the anode in electrolysis of a dilute sulfuric acid solution, then an alkaline sodium plumbite solution. In this manner, an adherent coating of spongy lead is produced upon the electrode and it is then ready for further use in producing dihydrostreptomycin as above described.

EXAMPLE 2

An electrolytic cell is assembled by arranging a 5 gallon size battery jar with its mouth facing upward and its bottom substantially level, placing a layer of mercury in the bottom of the jar with means for connecting it to an external potential source, and mounting a pair of vertically disposed elongate electrodes within the jar, spaced from each other and from the mercury layer, each comprising a tubular fritted glass cup surrounding a bundle of carbon rods, with means for connecting the carbon rods to a potential source. The fritted glass cups are charged with dilute sulfuric acid anolyte and the interior of the jar is then charged to about the same level with catholyte comprising an aqueous solution of streptomycin sulfate. About 10 liters of catholyte having a streptomycin content of about 70,000 micrograms per milliliter may be used.

Power is applied to the electrodes, the mercury layer being the cathode, and the catholyte is agitated by means aranged for this purpose. The electrolysis is carried out for about 37 hours using a substantially constant current of 5 amperes at 15 volts and maintaining the catholyte at a temperature of 37° C.±2° C. At the end of this period, the streptomycin content of the catholyte, as determined by the maltol method, is reduced to less than about 2%, while the biological activity remains substantially unchanged from its initial value. The catholyte is removed from the cell while power remains applied to the electrodes and it may be further processed as described in Example 1 above.

EXAMPLE 3

Using a 400 milliliter beaker as a container, with a layer of mercury as the cathode in the bottom of the beaker, and using an anode electrode comprised of a carbon rod within a porous cup containing dilute sulphuric acid, about 100 milliliters of a streptomycin sulphate solution having a biological activity of about 75,800 micrograms per milliliter is electrolyzed for about 7.75 hours at room temperature, using a current of about 300 to 400 milliamperes at 20 volts. After this period, testing of the streptomycin sulphate solution by the maltol method indicates that the streptomycin content is reduced to about 1.3%, although the biological activity of the solution remains substantially unchanged. Using an anesthetized cat as a test animal, the dihydrostreptomycin produced in this manner and administered to the cat caused a drop in the cat's blood pressure corresponding to about 8 millimeters of mercury. Dihydrostreptomycin produced by catalytic hydrogenation of another portion of the same streptomycin used in this electrolytic reduction, and administered to the same cat, resulted in a blood pressure reduction of 30 millimeters indicating that the catalytically hydrogenated material has a much higher histamine factor content than the material produced by electrolytic reduction. The streptomycin sulfate used as starting material in this process, when administered to the same test animal, produces a lowering of blood presure of about 33 millimeters of mercury.

EXAMPLE 4

The process described in Example 3 is repeated, except that the electrolysis is performed using a current of 2 to 4 amperes at about 60 volts, and after 14 minutes it is found that the biological activity of the catholyte remains substantially unchanged although analysis indicates substantial absence of streptomycin in the solution. It is found that using this high cathode potential results in excessive heating of the electrolyte and therefore it is desirable to apply the current in pulses so that the intervals between pulses will permit dissipation of at least a part of the heat produced.

EXAMPLE 5

Using the same apparatus and procedure described in Example 4, about 15 grams of streptomycin hydrochloride dissolved in 100 milliliters of water is subjected to electrolytic reduction until its streptomycin content is reduced from an initial value of 111,000 micrograms per milliliter to about 1400 micrograms per milliliter. During this reduction, the biological activity of the material decreases about 10%. It is found that when this product is administered to a cat as a test animal, the cat's blood pressure is reduced about 5 millimeters of mercury in contrast to a reduction of 17 millimeters of mercury produced by another sample of the same streptomycin hydrochloride catalytically hydrogenated to dihydrostreptomycin. The streptomycin hydrochloride before reduction produced a lowering of blood pressure in the test animal of 32 millimeters of mercury.

EXAMPLE 6

Using a divided cell having a pure lead anode and an amalgamated lead cathode, an anolyte of 5% sulfuric acid and a catholyte comprising about 710 grams of streptomycin sulfate dissolved in water to produce about 2½ liters of solution, a direct voltage is applied to the electrodes of 13 to 14 volts whereby a current of about 180 to 240 amperes passes through the cell. About one gram of hydrated zinc sulfate is provided in the catholyte to facilitate passage of the current and the pH is maintained between 5 and 8 by periodic additions of appropriate quantities of dilute sulfuric acid as the electrolysis progresses, and the temperature is maintained within the range of about 18 to 21° C. After 8 hours the reduction of the streytomycin is substantially complete and the dihydrostreptomycin isolated from the catholyte has an activity of 674 micrograms per milligram.

EXAMPLE 7

The process described in Example 6 is repeated except that the electrolysis is performed using a current of about 157 to 230 amperes for a period of 8 hours at a temperature in the range of 20 to 23° C. and with a pH of 6.75 to 7.65. The product obtained in this manner is found to have an activity of 641 micrograms per milligram.

Having thus described the subject matter of this invention, what it is desired to secure by Letters Patent is:

What is claimed is:

1. The process for making a dihydrostreptomycin which comprises cathodically reducing a substance selected from the group consisting of a streptomycin and acid addition salts thereof by introducing the selected substance into the catholyte of an electrolytic cell containing a porous diaphragm which separates an acidic anolyte from a non-alkaline to slightly alkaline catholyte, passing a current through the cell and continuing the resulting electrolysis until substantially all of the streptomycin compound has been converted to the corresponding dihydrostreptomycin compound while maintaining the temperature of the cell below that at which the streptomycin and dihydrostreptomycin decompose in the catholyte.

2. The process of claim 1 wherein the electrolysis is conducted in a cell having a cathode formed of a metal having a high hydrogen overvoltage which is maintained at a potential above the polarizing potential but below that which will cause evolution of gaseous hydrogen at the cathode.

3. The process of claim 2 wherein the pH of the catholyte is adjusted to a concentration within the range of about pH 5.0 to about pH 8.5 at the start of the electrolysis and maintained within that range throughout the electrolysis.

4. The process of claim 3 wherein the electrolysis is conducted at a cathode current density within the range of 0.1 to 0.01 ampere per square centimeter.

5. The process for making dihydrostreptomycin which comprises cathodically reducing streptomycin by electrolyzing a non-alkaline to slightly alkaline catholyte containing an ionizable streptomycin compound contained in the cathode compartment of an electrolytic cell having a metallic solid cathode of high hydrogen over-voltage and an anode in an acidic aqueous anolyte contained in the anode compartment of the cell through which current is passing between the anode and cathode, the anode and cathode compartments being separated by a semipermeable diaphragm and the temperature of the cell being maintained below 55° C., testing the catholyte periodically for streptomycin and removing the solution from the cell and recovering the dihydrostreptomycin compound when the test for streptomycin has become substantially negative.

6. The process of claim 5 in which the catholyte has a pH in the range of from pH 5.0 to pH 8.5.

7. The process for making dihydrostreptomycin sulphate which comprises cathodically reducing streptomycin sulphate by electrolyzing a concentrated aqueous solution of streptomycin sulphate having a pH above pH 5.0 but not more than pH 8.5 as the catholyte in the cathode compartment of an electrolytic cell containing a pure lead cathode and an anode in an acidic aqueous anolyte in the anode compartment of the cell through which current is passing between the anode and cathode, the said anode and cathode compartments being separated by a semipermeable diaphragm and the temperature of the cell being maintained at 25° C. to 30° C., testing the catholyte periodically for streptomycin and removing the solution from the cell and recovering the dihydrostreptomycin sulphate when the test for streptomycin has become substantially negative.

8. The process for producing a dihydrostreptomycin which essentially comprises charging an electrolytic cell, having anode and cathode compartments separated by a semipermeable diaphragm, with a nonalkaline, electric-current-conducting aqueous solution of the corresponding streptomycin as the catholyte and an aqueous solution of a strong inorganic acid as the anolyte, the acid being substantially nonreactive with the anode, and the cathode being substantially nonreactive with the components of the catholyte, passing an electric current between the anode and cathode in the respective compartments until the streptomycin is substantially completely reduced, the electrolysis being effected at a temperature below that at which the streptomycin and the dihydrostreptomycin decompose in the catholyte, and recovering the dihydrostreptomycin from the catholyte.

9. The process for making dihydrostreptomycin sulphate which comprises cathodically reducing streptomycin sulphate by electrolyzing a concentrated aqueous solution of streptomycin sulphate having a pH of from pH 5.0 to pH 8.5 as the catholyte in the cathode compartment of an electrolytic cell containing an amalgamated lead cathode and a pure lead anode in an acidic aqueous anolyte in the anode compartment of the cell through which current is passing between the anode and cathode, the said anode and cathode compartments being separated by a semipermeable diaphragm and the temperature of the cell being maintained at 18° C. to 21° C., testing the catholyte periodically for streptomycin and removing the solution from the cell and recovering the dihydrostreptomycin sulphate when the test for streptomycin has become substantially negative.

GABOR B. LEVY.

References Cited in the file of this patent

UNITED STATES PATENTS

| Number | Name | Date |
|---|---|---|
| 2,300,218 | Hales | Oct. 27, 1942 |
| 2,457,933 | Spiegelberg | Jan. 4, 1949 |
| 2,498,574 | Peck | Feb. 21, 1950 |
| 2,522,858 | Carboni et al. | Sept. 19, 1950 |

OTHER REFERENCES

Journal American Chemical Society, vol. 68 (July 1946), pp. 1390–91.

Bartz et al., Journal American Chemical Society, vol. 68 (Nov. 1946), pp. 2163–2166.

Fried et al., Journal American Chemical Society, vol. 69 (Jan. 1947), pp. 79–86.

Solomons et al., Science, vol. 109 (May 1949), pp. 515–516.

Waksman, Streptomycin (1949), pp. 47–49, 69–70.

Glasstone et al., Electrolytic Oxidation and Reduction (1936), pp. 3, 164, 184–5.